United States Patent
Yamashita et al.

(10) Patent No.: US 9,522,613 B2
(45) Date of Patent: Dec. 20, 2016

(54) ELECTRIC VEHICLE CONTROL SYSTEM AND POWER CONVERSION DEVICE

(71) Applicant: MITSUBISHI ELECTRIC CORPORATION, Chiyoda-ku, Tokyo (JP)

(72) Inventors: Yoshinori Yamashita, Tokyo (JP); Kenichi Kusano, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/903,819

(22) PCT Filed: Aug. 5, 2013

(86) PCT No.: PCT/JP2013/071173
§ 371 (c)(1),
(2) Date: Jan. 8, 2016

(87) PCT Pub. No.: WO2015/019405
PCT Pub. Date: Feb. 12, 2015

(65) Prior Publication Data
US 2016/0152158 A1 Jun. 2, 2016

(51) Int. Cl.
*B60M 3/06* (2006.01)
*B61L 3/00* (2006.01)
(Continued)

(52) U.S. Cl.
CPC . *B60M 3/06* (2013.01); *B60L 7/10* (2013.01); *B60L 7/14* (2013.01); *B60L 9/18* (2013.01);
(Continued)

(58) Field of Classification Search
CPC .............. B60L 1/003; B60L 7/10; B60L 7/14; B60L 7/18; B60L 7/26; B60L 9/22; B60L 15/002; B60L 15/2009; B60L 15/2045; B60L 25/00; B60L 2200/26; B60W 10/18; B60W 30/18127; B60T 1/10; B60T 8/17; B60T 13/665; B60T 17/228; B60T 2270/60; Y02T 10/72; Y02T 10/7283; Y02T 10/645; F16D 61/00
See application file for complete search history.

(56) References Cited

U.S. PATENT DOCUMENTS 7,451,842 B2    11/2008  Hemmi et al.
2008/0004760 A1*  1/2008  Sogihara .............. B60L 3/0076
                                                701/22
(Continued)

FOREIGN PATENT DOCUMENTS

JP    55-162392 U    11/1980
JP    61-68696 U     5/1986
(Continued)

OTHER PUBLICATIONS

International Search Report (PCT/ISA/210) issued on Aug. 27, 2013, by the Japanese Patent Office as the International Searching Authority for International Application No. PCT/JP2013/071173.
(Continued)

*Primary Examiner* — Thomas G Black
*Assistant Examiner* — Ce Li
(74) *Attorney, Agent, or Firm* — Buchanan Ingersoll & Rooney PC

(57) ABSTRACT

The present invention provides an electric vehicle control system that controls power consumption in each electric vehicle in a train configured by a plurality of electric vehicles, which includes: a plurality of power conversion devices, each of which converts power supplied from an overhead line to generate driving power for an AC motor when the train is running, and which convert regenerative power generated by the AC motor to return to the overhead line and determine as to whether the train is in a light load regenerative state when the train uses a regenerative brake; and a plurality of power consuming apparatuses that change an operation mode when at least one of the power conversion devices is in the light load regenerative state.

4 Claims, 4 Drawing Sheets

(51) Int. Cl.
B60L 7/10 (2006.01)
B60L 9/18 (2006.01)
B60L 7/14 (2006.01)
B60L 9/22 (2006.01)
B60L 11/18 (2006.01)
B60L 15/20 (2006.01)
H02M 7/44 (2006.01)

(52) U.S. Cl.
CPC .............. *B60L 9/22* (2013.01); *B60L 11/1803* (2013.01); *B60L 15/2009* (2013.01); *B61L 3/006* (2013.01); *H02M 7/44* (2013.01); *B60L 2200/26* (2013.01); *B60L 2240/12* (2013.01); *B60L 2240/423* (2013.01); *B60L 2250/16* (2013.01); *Y02T 10/7005* (2013.01); *Y02T 10/7275* (2013.01)

(56) References Cited

U.S. PATENT DOCUMENTS

2009/0167236 A1* 7/2009 Kono .................. B60L 9/00
                                                      318/806

2013/0073125 A1* 3/2013 Araki ..................... B60L 7/14
                                                      701/19
2013/0274975 A1* 10/2013 Gregg .................. B60W 10/196
                                                      701/22
2015/0165930 A1* 6/2015 Sawa ..................... B60L 7/26
                                                      701/19

FOREIGN PATENT DOCUMENTS

| | | | |
|---|---|---|---|
| JP | 63-224602 A | | 9/1988 |
| JP | 1-270703 A | | 10/1989 |
| JP | 2001-157303 A | | 6/2001 |
| JP | 2004088974 A | * | 3/2004 |
| JP | 2006-325316 A | | 11/2006 |
| JP | 2009-089503 A | | 4/2009 |
| JP | 2009-225630 A | | 10/2009 |
| JP | 2011-254594 A | | 12/2011 |

OTHER PUBLICATIONS

Written Opinion (PCT/ISA/237) issued on Aug. 27, 2013, by the Japanese Patent Office as the International Searching Authority for International Application No. PCT/JP2013/071173.

* cited by examiner

ELECTRIC VEHICLE CONTROL SYSTEM AND POWER CONVERSION DEVICE

FIELD

The present invention relates to an electric vehicle control system and a power conversion device.

BACKGROUND

In general, an electric vehicle is configured such that power from an overhead line is taken into a power collecting apparatus and an alternating current motor (hereinafter referred to just as an "AC motor") is driven by a power conversion device, such as an inverter apparatus using the power taken in. The electric vehicle employs what is called a regenerative brake, which obtains a braking force by making the AC motor operate in a regenerative mode when a vehicle is braking. The regenerative power generated at the time of braking is supplied to a load such as another train running nearby the own braking train through the overhead line or a third rail, and is consumed therein.

However, in the case of a low-active line section in which a small number of trains are running early in the morning or at night, there may be a case in which no other trains are nearby the own train (a regenerative load is insufficient), which means that the regenerative power generated by the regenerative brake may not be sufficiently consumed. In a case in which the regenerative power of the own train is larger than the power consumed by the other trains, the overhead line voltage is increased, which means that various types of apparatuses connected to the overhead line may be tripped or damaged by overvoltage.

Therefore, the inverter apparatus mounted in the electric vehicle detects the overhead line voltage (or a voltage corresponding to the overhead line voltage, for example, a filter capacitor voltage on the input side of the inverter apparatus) by a voltage detector. In a case in which the overhead line voltage or the like (such as the overhead line voltage, the filter capacitor voltage) is increased and exceeds a predetermined value, the inverter apparatus performs control such that the regenerative braking force is reduced in order to decrease the regenerative power, and thus prevent the voltage from increasing. In this case, insufficient braking force generated only by the regenerative brake is compensated for by using another brake (an air brake or the like), but because the other brake consumes power by converting electric energy into thermal energy, the utilization efficiency of the electric power is reduced. Therefore, it is desirable that the usage rate of the regenerative braking force itself be increased as much as possible.

With regard to the above-described problems, in the invention disclosed in Patent Literature 1, the regenerative power is temporarily stored in a power storage apparatus, and it is effectively used by being consumed by a load when a train is running or coasting.

CITATION LIST

Patent Literature

Patent Literature 1: Japanese Patent Application Laid-Open No. 2006-325316

SUMMARY

Technical Problem

However, in the invention disclosed in Patent Literature 1, there is a need arise to provide a power storage apparatus, and thus an increase in the total cost is unavoidable.

The invention has been made in view of the above problems, and an object thereof is arise to obtain an electric vehicle control system and a power conversion device that can realize an effective use of the regenerative power without installing any new apparatus such as a power storage apparatus.

Solution to Problem

In order to solve the aforementioned problems, an electric vehicle control system that controls power consumption in each electric vehicle in a train configured by a plurality of electric vehicles according to one aspect of the present invention is so constructed as to include: a plurality of power conversion devices, each of which converts power supplied from an overhead line to generate driving power for an AC motor when the train is running, and which convert regenerative power generated by the AC motor to return to the overhead line and determine as to whether the train is in a light load regenerative state when the train uses a regenerative brake; and a plurality of power consuming apparatuses that change an operation mode when at least one of the power conversion devices is in the light load regenerative state.

Advantageous Effects of Invention

According to the invention, it is possible to realize an electric vehicle control system that can effectively use regenerative power while avoiding an increase of costs.

DESCRIPTION OF EMBODIMENTS

Hereinafter, embodiments of an electric vehicle control system and a power conversion device according to the present invention will be described with reference to the drawings, but it should be noted that the present invention is not limited to those embodiments.

First Embodiment.

Figure 1:
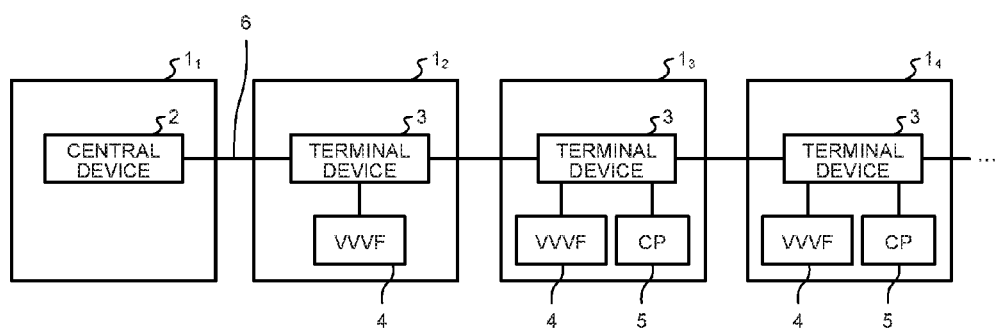
FIG. 1 is a diagram illustrating an example of a train composition in which an electric vehicle control system according to a first embodiment is installed.

FIG. 1 is a diagram illustrating an example of a train configuration in which an electric vehicle control system according to a first embodiment is installed. The train illustrated in FIG. 1 is configured from a plurality of vehicles 1 (vehicles $1_1$, $1_2$, $1_3$, $1_4$, . . . , and $1_n$). When the train is running, one of the vehicles $1_1$ and $1_n$ becomes the head vehicle and the other one becomes the tail vehicle.

The vehicles $1_1$ and $1_n$ located at either end of the train configuration are provided with a central device 2 that manages various types of train information. The vehicles $1_2$, $1_3$, . . . , and $1_{n-1}$, which are intermediate vehicles, are each provided with a terminal device 3. The central devices 2 and the terminal devices 3 are sequentially connected so as to communicate with each other through a backbone transmission path (an inter-vehicle transmission path) 6 disposed across the vehicles.

In the train illustrated in FIG. 1, the vehicle $1_2$ includes, for example, a power conversion device (VVVF) 4 that is a VVVF (variable voltage variable frequency) inverter. The vehicles $1_3$ and $1_4$ both include the power conversion device 4 and a compressor (CP) 5. In a case in which the train is running, the power conversion device 4 converts power supplied from the overhead line into a driving power for an AC motor (not illustrated). In addition, in a case in which the train is braking, the power generated by the AC motor serving as a regenerative brake is converted the other way and supplied to the overhead line. The compressor 5 forms an air brake system together with an air brake and an air tank (not illustrated), and generates compressed air to be stored in the air tank. Further, the central device 2 and the terminal device 3 are connected to other in-train apparatuses (not illustrated) (specifically, a brake apparatus, an air conditioner, illumination, a display apparatus, or the like). The central device 2 collects information from various types of in-train apparatuses including the power conversion device 4 and the compressor 5 and manages the apparatuses, and it performs an instruction of operation with respect to the various types of in-train apparatuses. The collected information is, for example, information on the operation state of each apparatus. In the operation instruction, for example, a command to change a target temperature is issued to the air conditioner.

Figure 2:
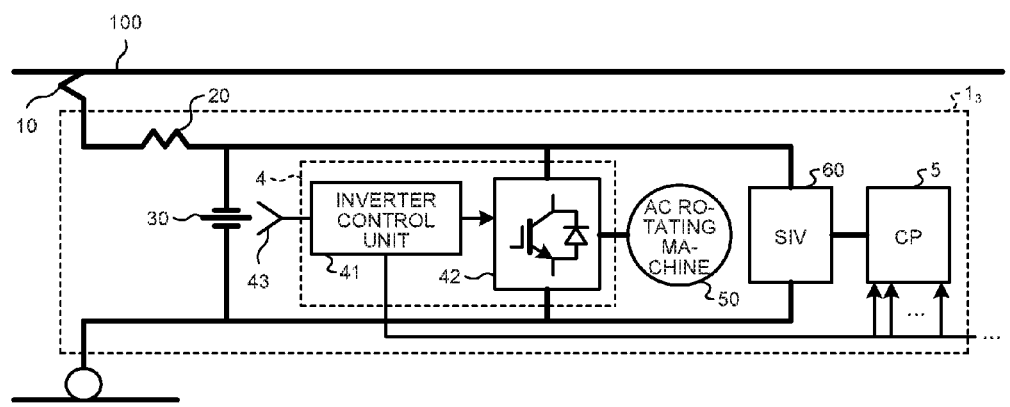
FIG. 2 is a diagram illustrating an exemplary configuration of a power conversion device.

FIG. 2 is a diagram illustrating an exemplary configuration of the power conversion device 4. As an example, the power conversion device 4 mounted in the vehicle $1_3$ is illustrated. The configurations of the power conversion devices 4 mounted in the other vehicles are also the same. In FIG. 2, the other apparatuses related to the operation of the power conversion device 4 are also depicted.

As illustrated in FIG. 2, the power conversion device 4 is configured to include an inverter control unit 41, an inverter 42, and a voltage detector 43. The inverter 42 is configured from a plurality of switch elements. The vehicle $1_3$ illustrated in FIG. 2 is, besides the power conversion device 4, equipped with a pantograph 10, a filter reactor 20, a filter capacitor 30, an AC motor 50, an auxiliary power source (SIV) 60, and the compressor 5. Note, however, that the description of the terminal device 3 illustrated in FIG. 1 is omitted.

In a case in which the train is running, the power conversion device 4 converts a DC voltage, which is applied from an overhead line 100 via the pantograph 10 and smoothened by the filter reactor 20 and the filter capacitor 30, so as to generate driving power for the AC motor 50. Specifically, the inverter control unit 41 controls each of the switch elements of the inverter 42 according to the voltage (corresponding to the input voltage) across both ends of the filter capacitor 30 detected by the voltage detector 43 and generates driving power for the AC motor 50. In addition, in a case in which the train is braking, the inverter control unit 41 is operated as a regenerative brake together with the AC motor 50. In other words, in the power conversion device 4, the inverter control unit 41 controls each of the switch elements of the inverter 42 to convert the power generated by the AC motor 50 serving as a power generator into a DC voltage to be regenerated for the overhead line 100. At this time, the inverter control unit 41 determines as to whether there is a load (another train or the like) that consumes regenerative power for the overhead line 100. When it is determined that the train is in a light load regenerative state, where there is no load (or little load if any), the inverter control unit 41 outputs a command signal to the compressor 5 to increase the power consumption. Therefore, because the power consumed by the own train itself is increased, it is made possible to prevent a braking force of the regenerative brake from being reduced, and also to efficiently use the regenerative power. Further, in the present specification, a state where all the regenerative power generated at the time of using the regenerative brake is not consumed in a load such as other trains is called a "light load regenerative state". Because utilization efficiency of the power is reduced in the light load regenerative state, it is desirable to avoid the light load regenerative state. When the light load regenerative state is detected, the inverter control unit 41 outputs a signal to command an increase of the power consumption amount with respect to the compressors 5 provided in other vehicles, in addition to the vehicle's own compressor 5.

Figure 3:
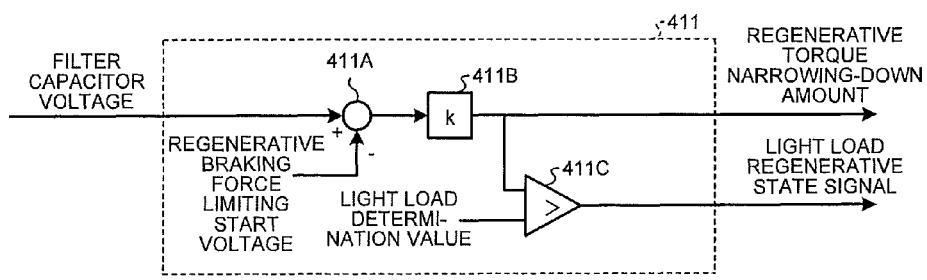
FIG. 3 is a diagram illustrating an exemplary configuration of a light load regenerative state determination unit of the first embodiment.

For example, the inverter control unit 41 includes a light load regenerative state determination unit 411 configured as illustrated in FIG. 3, and detects the light load regenerative state by using the light load regenerative state determination unit 411. The light load regenerative state determination unit 411 illustrated in FIG. 3 is configured from operation units 411A and 411B and a comparator unit 411C. In the operation unit 411A, a filter capacitor voltage detected by the voltage detector 43 and a regenerative braking force limiting start voltage, which is a lower limit value of the voltage at which a regenerative braking force is necessarily limited, are input, and the operation unit 411A subtracts the regenerative braking force limiting start voltage from the filter capacitor voltage. The operation unit 411B calculates a regenerative torque limiting amount by multiplying the calculation result (the difference between the filter capacitor voltage and the regenerative braking force limiting start voltage) at the operation unit 411A by a coefficient k (>0). The regenerative torque limiting amount is output to the outside and is also input to the comparator unit 411C. The comparator unit 411C compares the regenerative torque limiting amount with a light load determination value, and determines that it is the light load regenerative state in the case of "regenerative torque limiting amount>light load determination value". The determination result is output as a light load regenerative state signal. For example, in the case of the light load regenerative state, the output of the light load regenerative state signal is set to an H level (high level). The light load regenerative state signal is transferred to other power consuming apparatuses such as the compressor 5 in the configuration illustrated in FIG. 1. This signal is sent through transferring or transmitting by contact points. For example, in a case in which the terminal device is already provided as a vehicle information transmission device, no new device needs to be added by using this already-provided device. The light load regenerative state signal is transferred to the power consuming apparatuses respectively mounted in the own vehicle and in other vehicles.

Further, the inverter control unit 41 controls the inverter 42 according to the regenerative torque limiting amount. When the filter capacitor voltage exceeds the regenerative braking force limiting start voltage, "0<regenerative torque limiting amount" is satisfied, and then the inverter control unit 41 controls the inverter 42 such that it limits the regenerative braking force (to weaken the regenerative braking force). In the case of "regenerative torque limiting amount≤0", the inverter control unit does not limit the regenerative braking force.

The explanation of FIG. 2 is returned to here. The auxiliary power source 60 converts the DC voltage, which is applied from the overhead line 100 through the pantograph 10 and smoothened by the filter reactor 20 and then the filter capacitor 30, so as to generate driving power for the compressor 5. Further, the power output from the auxiliary power source 60 is also supplied to the in-train apparatuses (an illumination, an air conditioner, or the like) other than the compressor 5.

The compressor 5 monitors the remaining amount (air pressure) of air stored in the air tank (not illustrated) of the air brake system. When the remaining amount of the air is made equal to or less than a predetermined threshold (a first threshold) (for example, when the remaining amount is made equal to or less than 60%), the compressor 5 starts the generation of compressed air to be stored. This operation of generating the compressed air is ended when the remaining air amount reaches a second threshold (in this case, First threshold<Second threshold). In addition, light load regenerative state signals are input from the vehicle's own power conversion device 4 mounted therein and the power conversion devices 4 mounted in the other vehicles to the compressor 5. When at least one of the light load regenerative state signals respectively input from the plurality of power conversion devices 4 indicates the light load regenerative state, the compressor 5 is switched to an operation mode with large power consumption. For example, the threshold (the first threshold) at which the generation of the compressed air starts is changed so as to put forward the timing for starting the compressed air. In other words, the first threshold is changed to a value higher than before. In a case in which when the second threshold is changed to a higher value without causing any problem, operation stop timing may be delayed by changing the second threshold to a higher value in addition to the first threshold.

Figure 4:
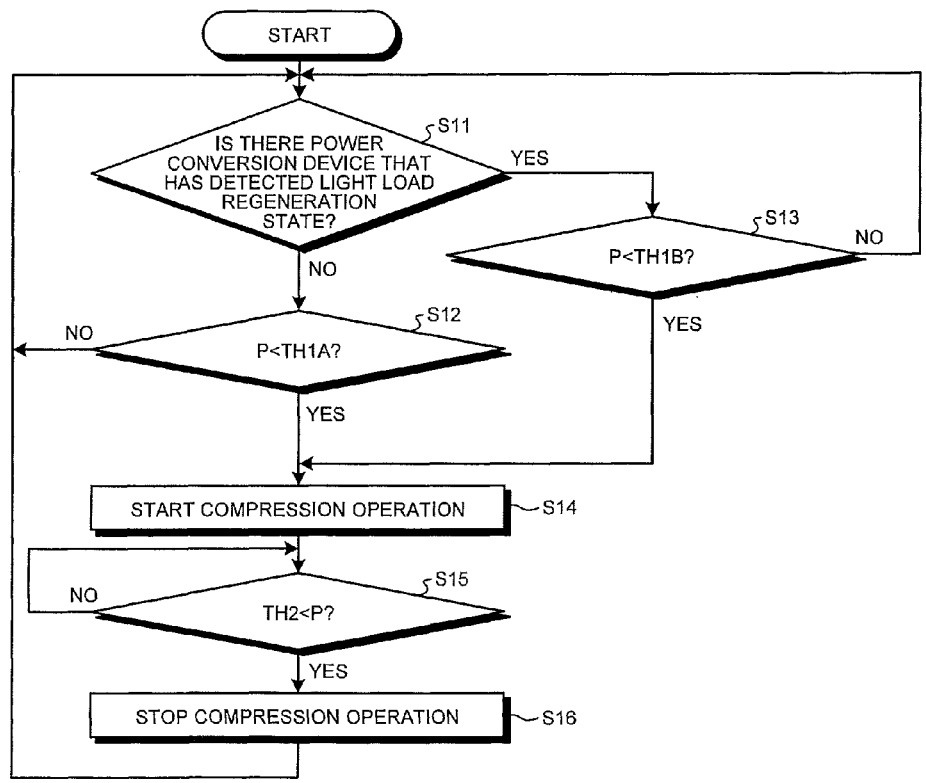
FIG. 4 is a flowchart illustrating an exemplary operation of a compressor.

FIG. 4 is a flowchart illustrating an exemplary operation of the compressor 5. In a state where the compressing operation (the generation operation of the compressed air) is not performed, the compressor 5 checks whether there is a power conversion device 4 that has detected the light load regenerative state (Step S11). In other words, in a case in which there is no signal indicating the light load regenerative state as a result of monitoring whether there is a signal indicating the light load regenerative state among the light load regenerative state signals input from the respective power conversion devices 4 in the train (Step S11: No), a check is made as to whether an air pressure P indicating the remaining air amount is less than a first operation start threshold TH1A (Step S12). In the case of TH1A≤P (Step S12: No), the procedure returns to Step S11 to check the respective light load regenerative state signals. In the case of P<TH1A (Step S12: Yes), the compressing operation starts (Step S14). In a case in which there is a signal indicating the light load regenerative state among the plurality of the light load regenerative state signals thus input (Step S11: Yes), a check is made as to whether the air pressure P is less than a second operation start threshold TH1B (Step S13). Herein, it is assumed that TH1A<TH1B. In other words, in a case in which there is a power conversion device 4 in the light load regenerative state, a high operation start threshold (the second operation start threshold) is used in comparison with the case in which there is not. In the case of TH1B≤P (Step S13: No), the procedure returns to Step S11 to check the respective light load regenerative state signals. In the case of P<TH1B (Step S13: Yes), the compressing operation starts (Step S14).

After the compressing operation starts in Step S14, the compressor 5 checks whether the air pressure P exceeds an operation stop threshold TH2 (Step S15). In the case of P≤TH2 (Step S15: No), the compressor 5 continue the compressing operation, and stops, in the case of TH2≤P (Step S15: Yes), the compressing operation (Step S16), and the procedure returns to Step S11 to check the light load regenerative state signal.

In this way, in a case in which the power conversion device 4 that has detected the light load regenerative state is present, the compressor 5 determines whether the compressing operation starts using a threshold higher than that of a normal time (in a case in which no power conversion device 4 that has detected the light load regenerative state is present). Therefore, in a case in which the power conversion device 4 that has detected the light load regenerative state is present, the start timing of the compressing operation occurs in advance, and the power consumed is increased in the own vehicle is increased.

Figure 5:
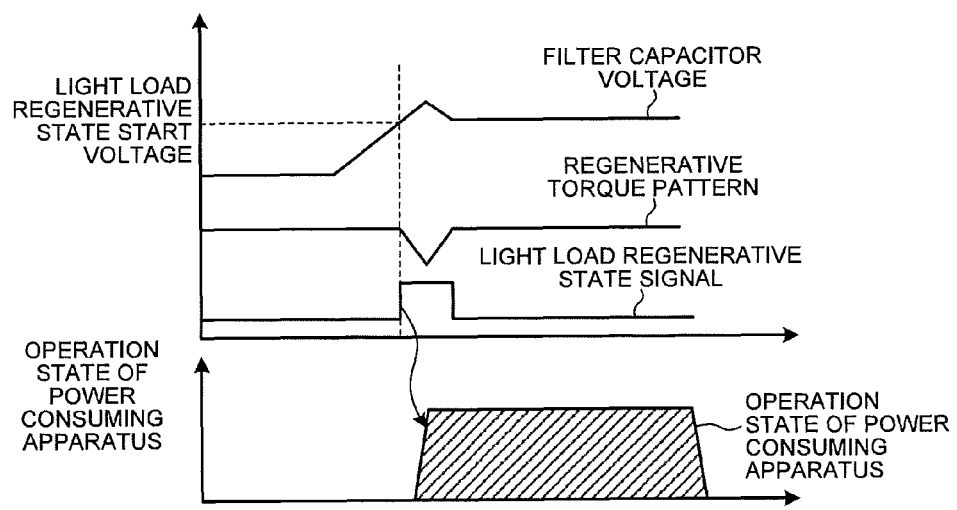
FIG. 5 is a diagram illustrating an exemplary operation of the electric vehicle control system of the first embodiment.

FIG. 5 is a diagram illustrating an exemplary operation of the electric vehicle control system according to this embodiment, and it illustrates a relation among the filter capacitor voltage that is the voltage across both ends of the filter capacitor 30 illustrated in FIG. 2, a regenerative torque pattern, the light load regenerative state signal, and the operation timing of the power consuming apparatus in the time axis. In a state where the load consuming the regenerative power is in the light load state, the filter capacitor voltage is increased when the regenerative brake is used and thus the regenerative power is generated. Then, as illustrated in FIG. 5, the regenerative torque pattern is limited when the filter capacitor power is made larger than a light load regenerative state start voltage. When the filter capacitor voltage is increased and thus the regenerative torque pattern is limited, the light load regenerative state signal becomes "H" due to the operation of the light load regenerative state determination unit 411 (see FIG. 3) provided in the inverter control unit 41. In a case in which the light load regenerative state signal is "H", the other power consuming apparatuses such as the compressor 5 are changed in their operation mode to increase the power consumption. For example, as described using FIG. 4, the compressor 5 uses the operation start threshold (that is, the operation start threshold that causes the compressing operation start at a timing earlier than before) that is different from the operation start threshold used so far. Therefore, the operation is made at an operation timing that is not used before. A part of the power energy caused by the regenerative brake is used by the power consuming apparatus such as the compressor 5 by starting at an early timing, and a regenerative load is ensured. As a result, the filter capacitor voltage is lowered, so the limiting amount of the regenerative torque pattern is reduced.

When the limiting amount of the regenerative torque pattern is reduced, a supplementary amount of the air brake is reduced. As a result, the burden of the regenerative brake is increased, and the energy saving effect can be improved from the perspective of all the vehicles.

Figure 6:
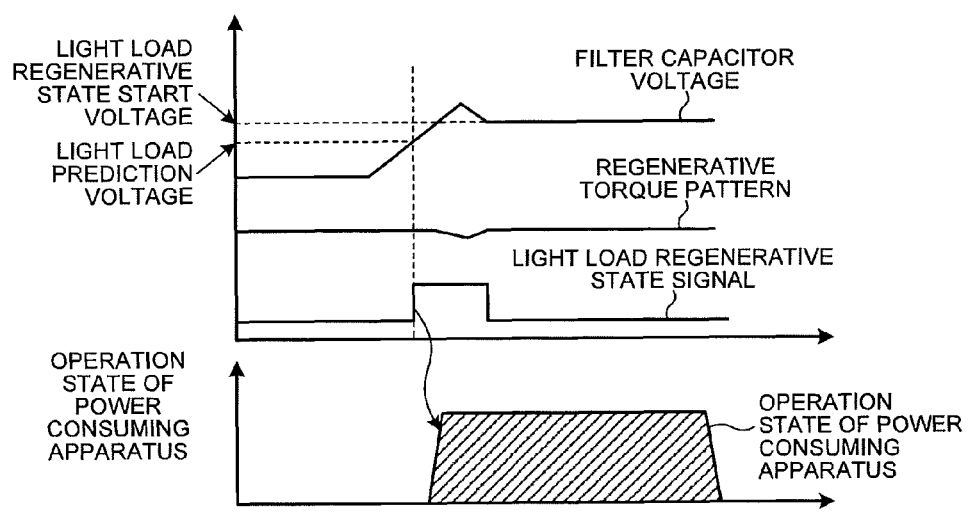
FIG. 6 is a diagram illustrating another exemplary operation of the electric vehicle control system of the first embodiment.

In addition, an apparatus like the compressor of the air brake system, which makes a mechanical operation, requires a time for starting an actual operation from the time when an operation start command is issued. Therefore, as illustrated in FIG. 6, it can be arranged such that a light load prediction voltage is first set as a voltage lower than the light load regenerative state start voltage, and thereafter the light load regenerative state signal may be set to "H" when the filter capacitor voltage becomes larger than the light load prediction voltage. Thus, the light load regenerative state signal can be output before the actual regenerative torque pattern starts to be limited. As a result, the operation timing of the power consuming apparatus can be advanced, and there is an advantage in that the limiting amount of the regenerative torque pattern is reduced.

In this way, in the electric vehicle control system according to this embodiment, in a case in which a light load determination state is detected, the power conversion device 4 informs this fact to the power consuming apparatus in its own train, and causes the power consumption in the power consuming apparatus to increase. Therefore, the usage rate of the regenerative braking force can be increased, and the regenerative power can be effectively used. In addition, because there is no need to prepare a new apparatus such as a power storage apparatus, it is made possible to avoid an increase in cost. In addition, because the power conversion device 4 informs the fact that it is in the light load regenerative state to all the power consuming apparatuses in the train, even when there are no apparatuses in a state in which the power consumption in its own vehicle can be increased, a possibility of increasing the power consumption in the apparatus in the other vehicle is raised. For example, even when the remaining air amount in the air tank of the own vehicle in which the air tank is installed is large and the compressor cannot be driven, if the remaining air amount in the air tank of the other vehicle is small, power can be consumed by driving the compressor of the other vehicle.

Second Embodiment.

In the first embodiment, the description has been made about a case in which the inverter control unit 41 of each of the plurality of power conversion devices 4 installed in the train generates a light load regenerative state signal, and outputs the signal to the power consuming apparatuses in the train. In addition, in a case in which a power conversion device 4 that has detected the light load regenerative state is present, each power consuming apparatus increases the power consumption by changing the operation start threshold or the like.

Figure 7:
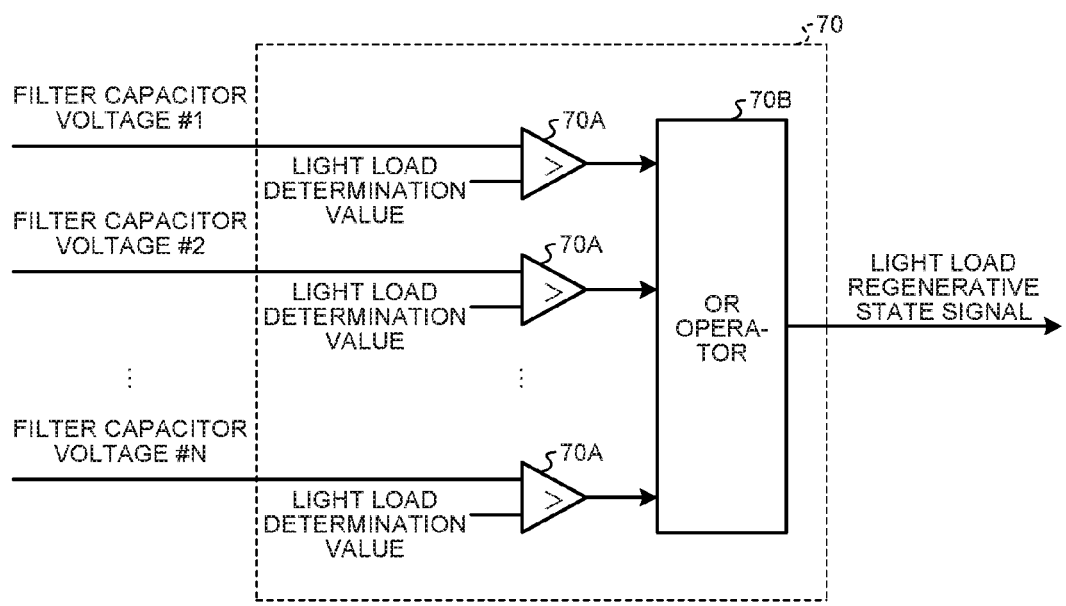
FIG. 7 is a diagram illustrating an exemplary configuration of a light load regenerative state determination unit of a second embodiment.

However, the determination of whether the train is in the light load regenerative state may not be individually performed by the power conversion device 4, but integrally performed by the central device 2 for example. In this case, the central device 2 includes a light load regenerative state determination unit 70 configured as illustrated in FIG. 7 for example, and the light load regenerative state determination unit 70 determines whether there is a power conversion device 4 that is in the light load regenerative state.

The determination of whether the train in the electric vehicle control system according to this embodiment is in the light load regenerative state will be described here.

In the electric vehicle control system according to this embodiment, each of the power conversion devices 4 in the train informs the detection value of a voltage across both ends of the filter capacitor 30 as a filter capacitor voltage to the central device 2. Each filter capacitor voltage of which the central device 2 is informed is input to the light load regenerative state determination unit 70. Each of a plurality of comparator units 70A of the light load regenerative state determination unit 70 compares the input filter capacitor voltage with the light load determination value, and then outputs the comparison result to an OR operation unit 70B. Specifically, the comparator unit 70 outputs an "H" when the filter capacitor voltage is larger than the light load determination value and, if not, outputs an "L". The OR operation unit 70B performs an OR operation on the comparison results in the respective comparator units 70A, and it outputs the result as a light load regenerative state signal. In a case in which the light load regenerative state signal is input to the power consuming apparatus such as the compressor 5, and the light load regenerative state signal is "H", that is, in a case in which one or more voltages among the filter capacitor voltages detected by the respective power conversion devices 4 are larger than the light load determination value, the power consuming apparatus is operated so as to increase the power consumption.

In this way, in this embodiment, the determination of whether or not there is a light load regenerative state is performed by the central device 2. The same effect as that of the first embodiment can be achieved even in a case in which this embodiment is applied. In addition, since the circuit for the determination can be integrally configured, it is made possible to suppress the increase in costs.

In each of the embodiments, a description has been made for a case in which the operation of generating the compressed air to be stored in the air tank of the air brake system is performed by the compressor to increase the power consumption of the regenerative power, but another apparatus may be operated instead of the compressor, or the another apparatus may be operated in addition to the compressor. As an example of another apparatus, an air conditioner is a possibility.

The power consumption of the regenerative power may be increased using the air conditioner. For example, if the air conditioner is in a cooling operation when the light load regenerative state is detected, a setting temperature (a target temperature) of the air conditioner is temporarily reduced, and if the air conditioner is in a heating operation, the setting temperature is temporarily increased so as to increase the power consumption.

INDUSTRIAL APPLICABILITY

As described above, the electric vehicle control system according to the invention is used in a railway system where trains each configured from electric vehicles using a regenerative brake are running.

REFERENCE SIGNS LIST $1_1$, $1_2$, $1_3$, $1_4$ VEHICLE
2 CENTRAL DEVICE
3 TERMINAL DEVICE
4 POWER CONVERSION DEVICE (VVVF)
5 COMPRESSOR (CP)
10 PANTOGRAPH
20 FILTER REACTOR
30 FILTER CAPACITOR
41 INVERTER CONTROL UNIT
42 INVERTER
43 VOLTAGE DETECTOR
50 AC MOTOR
60 AUXILIARY POWER SOURCE (SIV)

70, 411 LIGHT LOAD REGENERATIVE STATE DETERMINATION UNIT
100 OVERHEAD LINE
70B, 411A, 411B OPERATION UNIT
70A, 411C COMPARATOR UNIT

The invention claimed is:

1. An electric vehicle control system to control power consumption in each electric vehicle in a train configured by a plurality of electric vehicles, the electric vehicle control system comprising:
a plurality of power conversion devices, each to convert power supplied from an overhead line to generate driving power for an AC motor when the train is running, and to convert regenerative power generated by the AC motor to return to the overhead line when the train uses a regenerative brake;
a light load regenerative state determination unit to output a light load regenerative state signal when an input voltage of the power conversion device becomes larger than a light load prediction voltage, which is lower than a light load regenerative state start voltage; and
a plurality of power consuming apparatuses to change an operation mode when the light load regenerative state signal is output, wherein the power consuming apparatuses include a compressor, wherein the compressor generates compressed air to be stored in an air tank of an air brake system when a remaining amount of the air stored in the air tank becomes lower than a predetermined threshold, and the compressor changes the threshold to be a value higher than usual, when the light load regenerative state signal is output.

2. An electric vehicle control system to control power consumption in each electric vehicle in a train configured by a plurality of electric vehicles, the electric vehicle control system comprising:
a plurality of power conversion devices, each to convert power supplied from an overhead line to generate driving power for an AC motor when the train is running, and to convert regenerative power generate by the AC motor to return to the overhead line when the train uses a regenerative brake;
a light load regenerative state determination unit to output a light load regenerative state signal when an input voltage of the power conversion device becomes larger than a light load prediction voltage, which is lower than a light load regenerative state start voltage; and
a plurality of power consuming apparatuses to change an operation mode when the light load regenerative state signal is output, wherein the power consuming apparatuses include an air conditioner and when the light load regenerative state signal is output, the air conditioner changes a target temperature to a value lower than before when the air conditioner is in a cooling operation, and changes the target temperature to a value higher than before when the air conditioner is in a heating operation.

3. An electric vehicle control system that controls power consumption in each electric vehicle in a train configured by a plurality of electric vehicles, the electric vehicle control system comprising:
a plurality of power conversion devices, each to converts power supplied from an overhead line to generate driving power for an AC motor when the train is running, and to convert regenerative power generated by the AC motor to return to the overhead line when the train uses a regenerative brake;
a central device to output a light load regenerative state signal when an input voltage of the power conversion device becomes larger than a light load prediction voltage, which is lower than a light load regenerative state start voltage; and
a plurality of power consuming apparatuses to change an operation mode when the light load regenerative state signal is output from the central device, wherein the power consuming apparatuses include a compressor, wherein the compressor generates compressed air to be stored in an air tank of an air brake system when a remaining amount of the air stored in the air tank becomes lower than a predetermined threshold, and the compressor changes the threshold to a value higher than usual, when the light load regenerative state signal is output from he central device.

4. An electric vehicle controls system that controls power consumption in each electric vehicle in a train configured by a plurality of electric vehicles, the electric vehicle control system comprising:
a plurality of power conversion devices, each to convert power supplied from an overhead line to generate driving power for an AC motor when the train is running, and to convert regenerative power generated by the AC motor to return to the overhead line when the train uses a regenerative brake;
a central device to output a light load regenerative state signal when an input voltage of the power conversion device becomes larger than a light load prediction voltage, which is lower than a light load regenerative state start voltage; and
a plurality of consuming apparatuses to change an operation mode when the light load regenerative state signal is output from the central device, wherein the power consuming apparatuses include an air conditioner, and when the light load regenerative state signal is output from the central device, the air conditioner changes a target temperature to be a value lower than before if the air conditioner is in a cooling operation, and changes the target temperature to a value higher than before if the air conditioner is in a heating operation.

* * * * *